United States Patent
Teow et al.

(10) Patent No.: US 6,785,742 B1
(45) Date of Patent: Aug. 31, 2004

(54) SCSI ENCLOSURE SERVICES

(75) Inventors: Kha Sin Teow, San Jose, CA (US); Paul Ramsay, Fremont, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 0 days.

(21) Appl. No.: 09/510,541

(22) Filed: Feb. 22, 2000

Related U.S. Application Data (60) Provisional application No. 60/121,353, filed on Feb. 24, 1999.

(51) Int. Cl.[7] .............................................. G06F 13/00
(52) U.S. Cl. ............................... 710/1; 710/33; 710/36; 710/74
(58) Field of Search ............................... 710/1, 33, 74, 710/36

(56) References Cited

U.S. PATENT DOCUMENTS

| | | | |
|---|---|---|---|
| 5,859,837 A | * 1/1999 | Crayford | 370/230 |
| 6,041,381 A | 3/2000 | Hoese | 710/129 |
| 6,115,772 A | * 9/2000 | Crater | 710/129 |
| 6,118,776 A | * 9/2000 | Berman | 370/351 |
| 6,314,477 B1 | * 11/2001 | Cowger et al. | 710/22 |
| 6,330,246 B1 | * 12/2001 | Denning et al. | 370/438 |

* cited by examiner

Primary Examiner—Jeffrey Gaffin
Assistant Examiner—Mohammad O. Farooq
(74) Attorney, Agent, or Firm—Wong, Cabello, Lutsch, Rutherford & Brucculeri, L.L.P.

(57) ABSTRACT

A method and system for a management station managing a plurality of routing devices within a fabric. In one embodiment, this management of routing devices comprising the fabric occurs in the Storage Area Network environment. Use is made of a protocol which already exists in a Storage Area Network environment, such as the Fibre Channel Protocol for SCSI ("FCP", for managing routing devices within a fabric. Each routing device comprising the fabric is assigned a logical unit number, which, in one embodiment, is based on the domain identifiers of each routing device. Further, the routing device to which the management station is physically is also labeled as LUN 0, and serves as the logical fabric SCSI Enclosure Services controller unit. The fabric interacts with the management station as though the fabric were a logical fabric SCSI Enclosure Services device coupled to a plurality of logical fabric SCSI Enclosure Services units. The management station is thus able to obtain information about, and manage, any of the routing devices comprising the fabric.

33 Claims, 9 Drawing Sheets

| Routing Device | Domain_ID | Unique LUN Value (in Hex) |
|---|---|---|
| 302 | 5 | 00000000 00000000 |
| 304 | 0 | 01000000 00000000 |
| 302 | 5 | 01050000 00000000 |
| 306 | 6 | 01060000 00000000 |

SCSI ENCLOSURE SERVICES

RELATED APPLICATIONS

This application claims the benefit, under 35 USC §119 (e), of U.S. Provisional Application Serial No. 60/121,353, by Kha Sin Teow, et al, filed on Feb. 24, 1999, entitled "SCSI Enclosure Services," which is incorporated herein by reference in its entirety.

BACKGROUND

1. Technical Field

The present invention relates generally to the field of computer networks, and more particularly, to the management of storage networks.

2. Background of the Invention

As a result of continuous advances in technology, particularly in the area of computer networking, the last decade has seen an explosion in the volume of data that is being captured, processed, stored and manipulated in business environments. This data explosion has fueled an increase in demand for data storage capacity. The challenges presented by this increased demand for data storage further are amplified by the fact that it is not just the existence of data alone that provides value, but rather the manner in which the data is stored, accessed, and managed, that creates a competitive advantage.

Increased reliance on applications ranging from business intelligence and decision support, data warehousing and data mining of large databases, disaster tolerance and recovery, enterprise software, and imaging and graphics have all contributed to this trend. In addition, the development of Internet-based business operations and electronic-commerce specifically has intensified the demand placed on data centers. Customer interactions over the Internet have increased operational focus on the performance, scalability, management and flexibility of systems that use business-critical data. This dependence on data for fundamental business processes by employees, customers and suppliers has greatly increased the number of input and output ("I/O") transactions required of computer storage systems and servers. Thus, it is important that data storage be viewed as a centralized, managed resource that is available and capable of expansion without sacrificing access or performance.

Despite the increased attention and resources devoted to data storage requirements, the technical capabilities of data storage systems have not kept pace with increasing data management demands and with the advancements in other networking technologies. In the 1980s, the near ubiquity of personal computers ("PCs"), workstations and servers required broader connectivity, resulting in the development of local and wide area networks to support messaging between computer systems. The data used by computers and servers connected to local and wide area networks typically are located on computer storage systems and servers, which store, process and manipulate data. The adoption of high speed messaging technologies such as gigabit Ethernet and asynchronous transfer mode ("ATM"), increased local and wide area network transmission speeds by more than 1,000 times during the 1990s. However, storage-to-server data transmission speeds increased by less than ten times during this period, creating a bottleneck between the local or wide area network and business-critical storage systems and servers.

Figure 1:
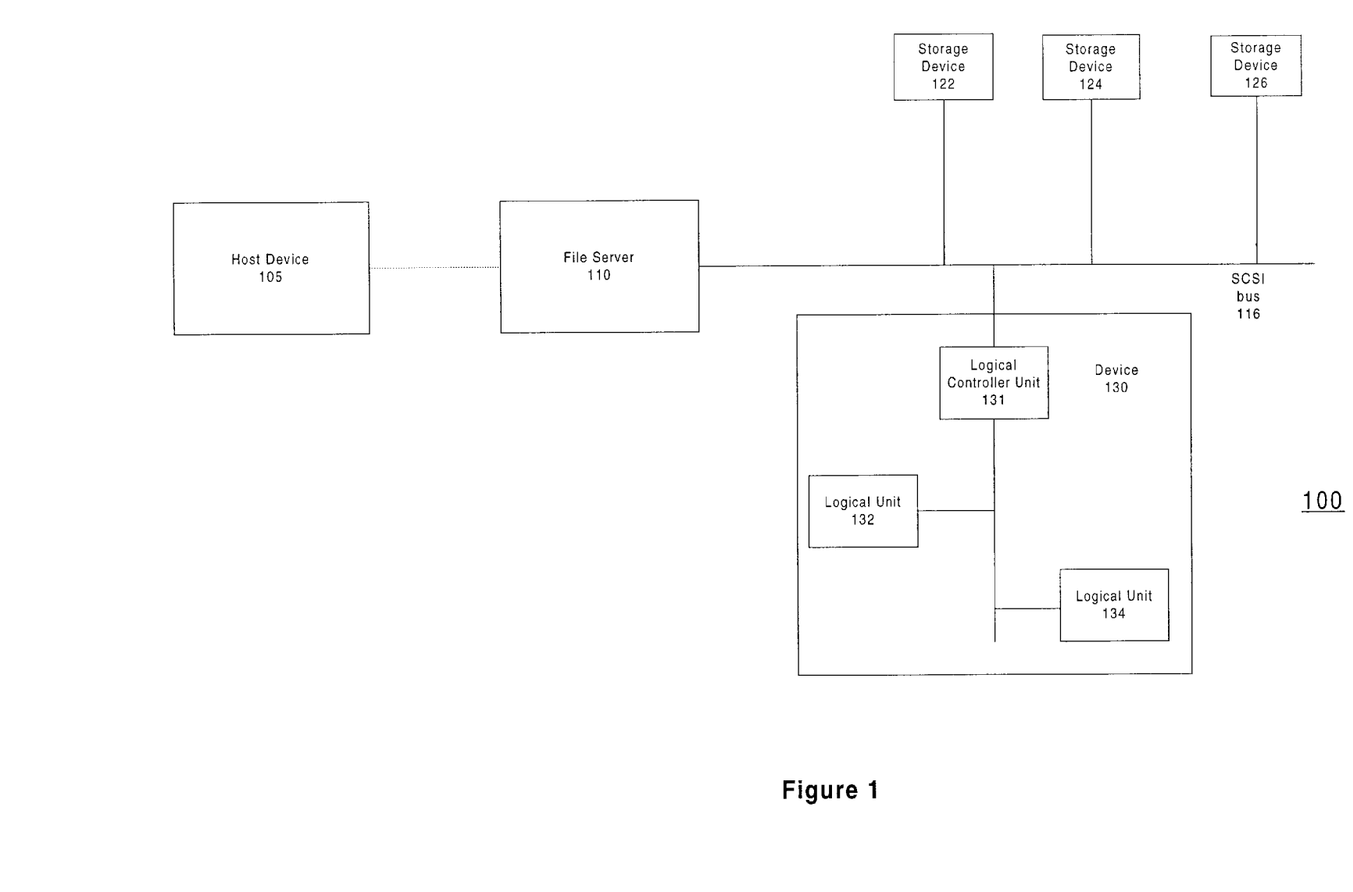
FIG. 1 illustrates a high level block diagram of a conventional Network Attached Storage system.

One conventional solution with regard to data storage and retrieval is Network Attached Storage ("NAS"), which commonly utilizes a Network File System ("NFS"). As illustrated in FIG. 1, such a system 100 includes a host device 105, a file server 110, a Small Computer Systems Interface ("SCSI") bus 116 and a plurality of storage devices 122, 124, 126 and 130. Device 130 further includes a logical controller unit 131 and logical units 132 and 134. A logical unit is a target-resident entity that implements a device model and executes SCSI commands originated by an initiator. An initiator is a device that initiates communication with, and transmits commands to other devices.

Host device 105 and file server 110 can be conventional personal computers from, for instance, IBM Corporation of Armonk, N.Y., or high-end computer workstations from, for instance, Sun Microsystems, Inc. of Palo Alto, Calif. Storage devices 122, 124, 126 can include, for instance, IBM's Ultrastar 18LZX. Device 130 can be a Redundant Array of Inexpensive Disks ("RAID") system, such as a GigaRAID/AA from nStor Corporation of San Diego, Calif. with the logical units 132 and 134 representing individual hard disks, such as Barracuda 18LP-18.2GB-ST318275LW/LC of Seagate of Scotts Valley, Calif.

File server 110 is coupled via SCSI bus 116 to storage devices 122, 124, 126 and 130. The SCSI standard was adopted as the open I/O interface standard for storage-to-server connections in the 1980s. When host device 105 attempts to access any of these storage devices 122, 124, 126, or 130, host device 105 must access them via file server 110. In particular, host device 105 must establish a connection 103 with file server 110, and then retrieve information stored within storage devices 130, 122, 124, and 126 by communicating with file server 110. Such an NAS system 100, however, is inherently inefficient because host device 105 must access each device via file server 10. By requiring access to storage devices 130, 122, 124 and 126 to be routed through file server 110, bandwidth constraints directly related to file server 110 will exist. In addition, with such a system 100 dedicated to a specific application, the system 100 is not scalable. There also is a single point of failure in that if file server 110 is not available, the host device 105 will not be able to access any of the storage devices 122, 124, 126 and 130.

An alternative Storage Area Network ("SAN") architecture, which attempts to solve the limitations associated with NAS systems described above, is a fabric-based SAN. A fabric typically is constructed with one or more routing devices, such as switches, and each storage device (or group of storage devices, for example, in the case of a loop-based architecture) is coupled to the fabric. Generally, devices coupled to the fabric are capable of communicating with every other device coupled to the fabric. This eliminates the bottleneck created in NAS, where every device coupled to a file server 110 has to be accessed via that single file server 110. Further, the scalability limitations of the NAS system also are avoided by fabric-based SANs. In addition, since every device does not have to be accessed via a single file server, there is no single point of failure in the fabric-based SANs.

One implementation of a fabric-based SAN is Fibre Channel, which is an American National Standards Institute ("ANSI") high-speed, high-performance storage-to-server and server-to-server interconnect protocol. This application relates to "Fibre Channel Protocol for SCSI (FCP), Rev 012, May 30, 1995" and "Fibre Channel Physical and Signalling Interface-3, Rev 9.4, Nov. 5 1997," both published by American National Standard for Information Technology, which are each incorporated herein by reference in their entirety.

Since Fibre Channel can support large data block transfers at gigabit speeds, Fibre Channel is well suited for data transfers between storage systems and servers. Fibre Channel also supports multiple protocols such as SCSI and Internet Protocol ("IP"). Furthermore, Fibre Channel provides transmission reliability with guaranteed delivery and transmission distances of up to 10 kilometers. Fibre Channel complements and supports advancements in local and wide area network technologies, such as gigabit Ethernet and ATM, which directly cannot effectively transfer large blocks of data.

Fibre Channel-based SANs deliver centrally managed storage through high availability architectures, managing systems, and exploiting effective storage methodologies like RAID and mirroring. The Fibre Channel Protocol for SCSI ("FCP") relies upon the Small Computer System Interface ("SCSI") communication scheme to communicate between devices, which are coupled to the fabric. One version of SCSI on which FCP can rely is SCSI-3. By incorporating SCSI, a protocol already native to many devices, into the fabric-based scheme, Fibre Channel is able to provide high-performance (e.g. gigabit per second data delivery and gigabit per second backup and recovery), a highly available storage network, and continuous access during network expansion. In addition, such a system can provide continuous access during network repair.

In order to optimize the use of a Fibre Channel-based SAN, the routing devices within the SAN's fabric need to be able to be managed in order to provide universal, seamless and easy access to storage resources. Conventional management techniques require use of multiple protocols. For instance, in an IP network, the Simple Network Management Protocol ("SNMP") is used to manage the network. However, SNMP requires the Internet Protocol ("IP"), which is not commonly available in a SAN storage device. Therefore it is highly desirable to use the same FCP protocol for managing the routing devices within the fabric-based SAN as well as for communicating with the devices coupled to the fabric. This approach will eliminate the need for a multi-protocol system, as well as create more flexibility in the choice of management systems available.

Accordingly, a need exists for managing routing devices within a fabric, based on a protocol that already exists within a fabric-based SAN.

SUMMARY OF THE INVENTION

In accordance with the system and method of the present invention, routing devices within a fabric are managed using a native protocol that exists within a fabric-based SAN. Through such a management scheme, a management station can manage the fabric by treating the fabric as a logical fabric SES device. In one embodiment of the present invention, a plurality of routing devices within the fabric are recharacterized as logical units, which are included within the logical fabric SES device. In such a management scheme, the management station interacts with the logical fabric SES device as if the logical fabric SES device includes a smart controller and multiple logical units, each with a separate logical unit number. The management station then can perform management functions, such as configuration (e.g., enable or disable a routing device port) and performance evaluation (e.g., monitor temperature sensor readings of a routing device or monitor the performance or error counters of a routing device port) on any routing device within the fabric.

DETAILED DESCRIPTION OF EMBODIMENTS OF THE PRESENT INVENTION

Embodiments of the present invention are now described with reference to figures where like reference numbers indicate identical or functionally similar elements and the left most digit(s) of each reference number corresponds to the figure in which the reference number is first used.

The following discussion will focus upon Fibre Channel-based SANs, and how routing devices within the fabric in a Fibre Channel based SAN are recharacterized as Logical Units. However, one skilled in the art will recognize that the present invention may be applied to any network topology or protocol, which utilizes a fabric.

Figure 2A:
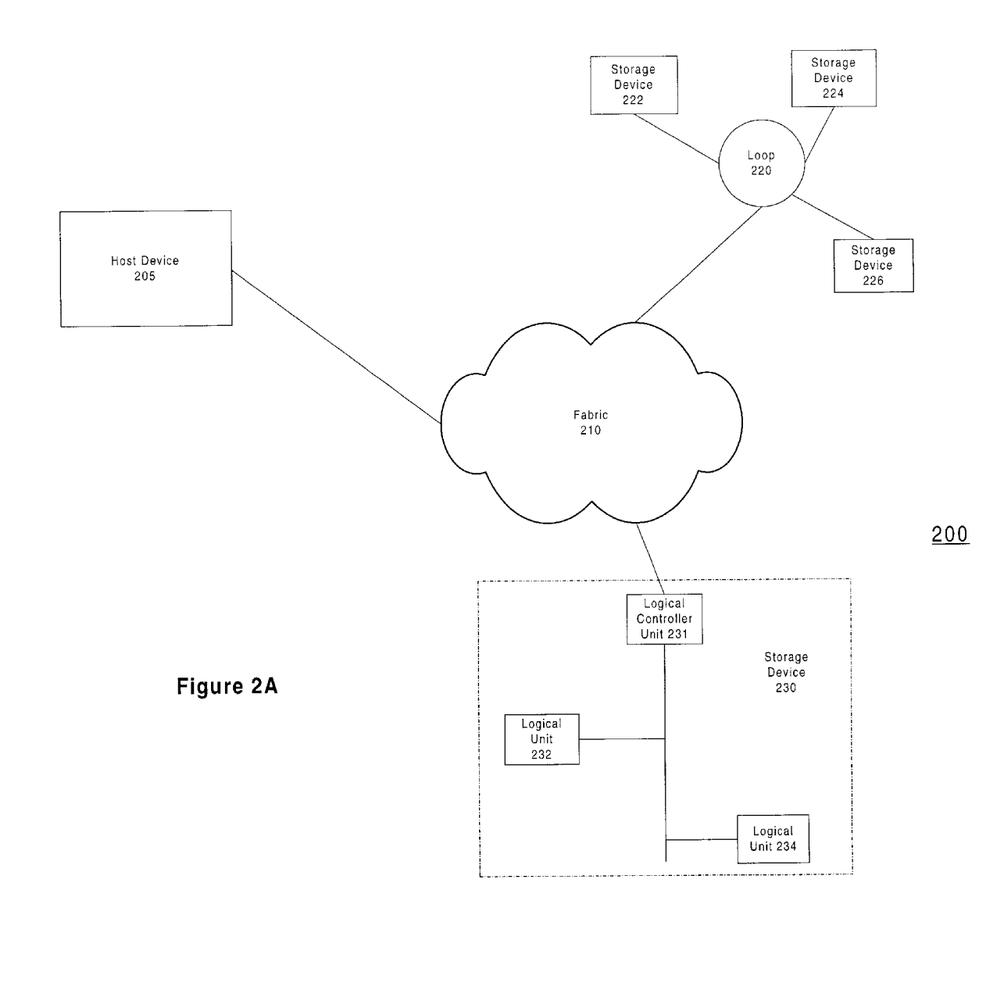
FIG. 2A illustrates a high level block diagram of a fabric-based Storage Area Network system of an embodiment of the present invention.

FIG. 2A illustrates a Fibre Channel fabric-based SAN 200 of an embodiment of the present invention. SAN 200 includes a fabric 210 and host device 205, storage devices 222, 224, 226 and 230 and a loop 220. Storage device 230 further includes logical controller unit 231 and logical units 232 and 234. Loop 220 is an arbitrated loop with a shared bandwidth for storage devices 222, 224 and 226, which are coupled to loop 220. Host device 205 can be a conventional computer, such as a personal computer, or an IBM RS6000 or a Sun Ultra 30 Workstation. Device 230 can be a RAID system, such as a Clariion 5600C from EMC of Hopkinton, Mass. Device 230 includes logical units 232 and 234, as well as a logical controller 231.

Fabric 210 seamlessly couples host device 205 to device 230, and to storage devices 222, 224, and 226 via loop 220. Thus, a host device, such as host device 205, which is coupled to fabric 210 can communicate over fabric 210 to any other device, such as device 230, regardless of the composition of fabric 210. If, however, the fabric 210, in an alternative embodiment, is divided into zones, then host device 205 only would be able to access and manage those devices that are within the same zone as host device 205.

If host device 205 intends upon communicating with a storage device (e.g., device 230), which is coupled to the fabric 210, host device 205 would be considered an "initiator." An initiator is a device that initiates communication with, and transmits commands to other devices. Storage device 230 would be considered a "target" because storage device 230 would receive instructions from an initiator such as host device 205, and would execute those instructions.

Figure 2B:
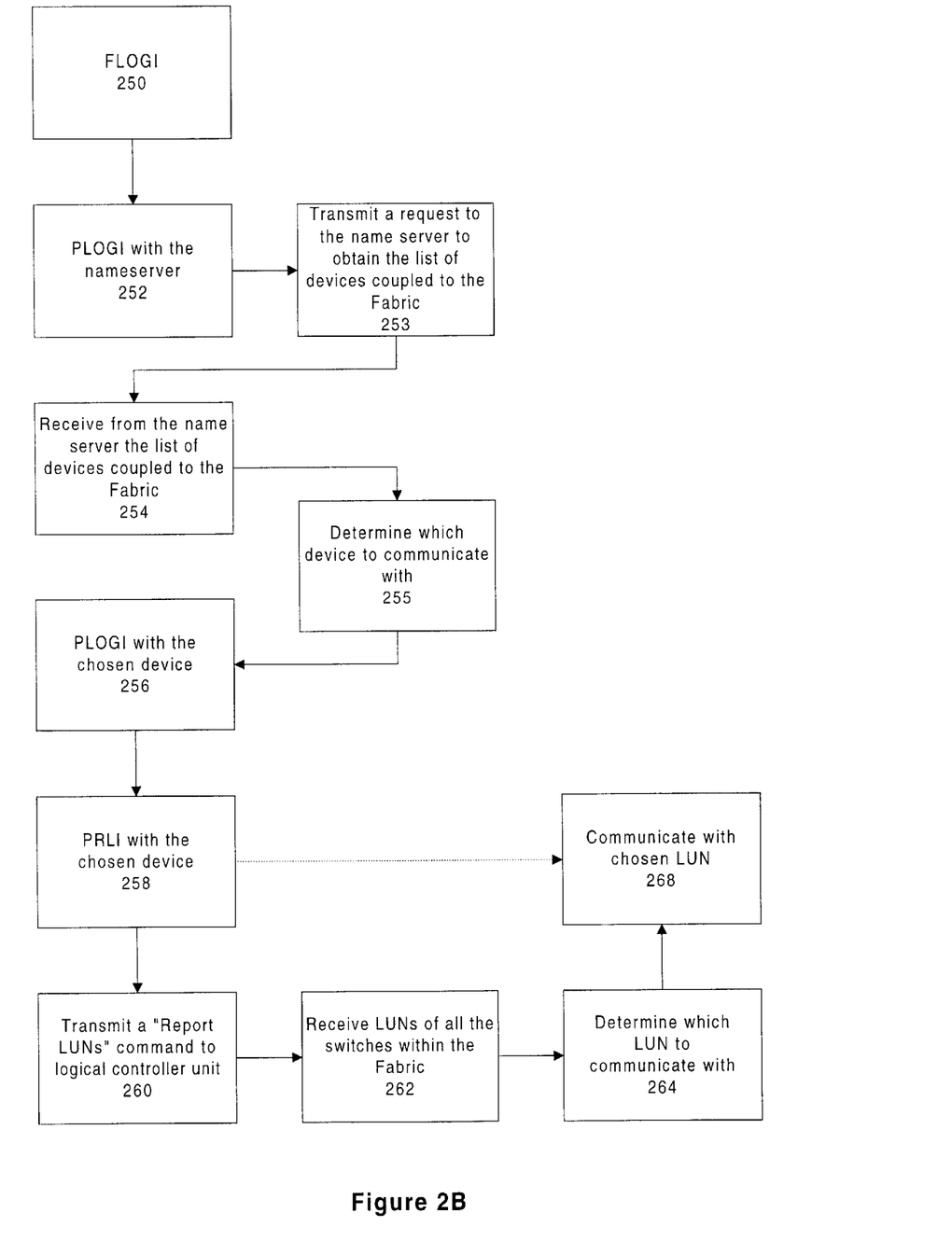
FIG. 2B illustrates a flowchart of the steps performed by a first device for communicating with a second device coupled to the fabric of an embodiment of the present invention.

FIG. 2B illustrates a flowchart of the steps for initiating FCP communication between devices that are attached to a fabric 210 of an embodiment of the present invention. A device, such as 205, logs into fabric 210 by performing a Fabric Login ("FLOGI") 250. During this step, the fabric 210 assigns a Fibre Channel well-known address to the initiator device, which in this case is host device 205. Next, the host device 205 performs a Port Login ("PLOGI") 252 with the name server. The host device 205 communicates with the name server by transmitting the well-known address (e.g., FFFFFCh) of the name server. In one embodiment, the name server can reside within the fabric 210 and can maintain registered information for each of the devices coupled to the fabric 210. One skilled in the art will recognize that in an alternative embodiment, the name server can reside outside the fabric 210.

Host device 205 transmits 253 a request to the name server to obtain a list of the devices coupled to the fabric 210. Host 205 receives 254 a response from the name server, which includes information regarding the addresses of the various storage devices 222, 224, 226, and 230, that are coupled to fabric 210. Host device 205 utilizes this address information to make a determination 255 regarding with which of the storage devices 222, 224, 226, or 230 to communicate. Once this target storage device, e.g. 230, has been chosen 255, host device 205 performs a PLOGI 256 with that target storage device 230. As previously discussed, target storage device 230 includes a logical controller unit 231, and logical units 232 and 234. Host device 205, therefore, performs PLOGI 256 with logical controller unit 231 to establish contact so with target storage device 230. Host device 205 then performs a Process Login ("PRLI") 258 with logical controller unit 231 to determine the capabilities of target storage device 230, as to whether host device 205 and target storage device 230 can communicate with each other using FCP. Upon establishing that host device 205 and target storage device 230 can communicate with each other, host device 205 optionally transmits 260 a "Report LUNs" command to the logical controller unit 231. This command results in host device 205 receiving from logical controller unit 231 a list of all of the LUNs within storage device 230. Host device 205 utilizes this list of LUNs to determine 264 with which logical unit host device 205 will communicate. Upon selecting a LUN, host device 205 may communicate 260 with the chosen logical unit, (e.g., logical unit 232). If host device 205 had initially chosen 255 to communicate with a different storage device, such as storage device 222, which unlike storage device 230 does not include logical units, then PLOGI 256 and PRLI 258 would have been performed directly with target storage device 222, and step 268 would have been performed directly after step 258. Steps 260, 262, and 264 would not have been performed at all.

Figure 3:
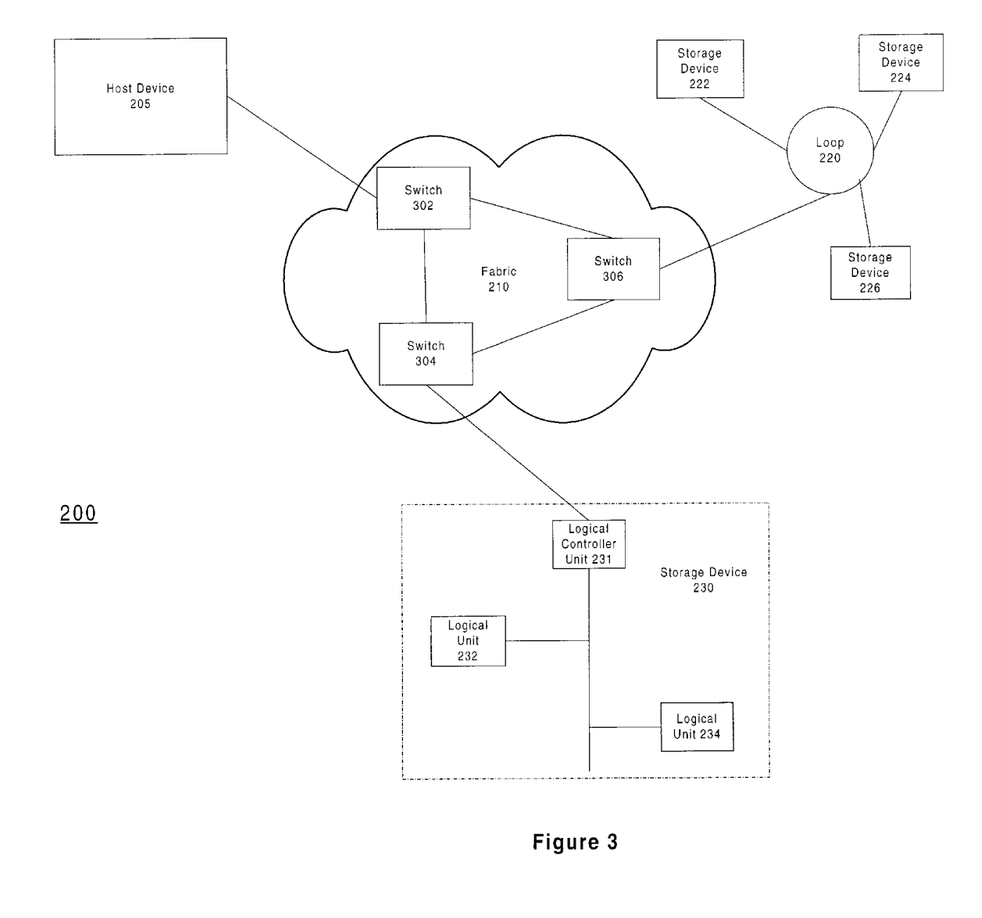
FIG. 3 illustrates a more detailed block diagram of the fabric of an embodiment of the present invention.

FIG. 3 illustrates a more detailed block diagram of the fabric 210 of an embodiment of the present invention. Fabric 210 includes several routing devices 302, 304, and 306 which are connected with each other. Routing devices 302, 304, and 306 can be any type of networking device including switches, hubs or routers. In order to manage these routing devices, information about and the ability to manage these routing devices 302, 304, and 306 is needed to be able to optimally configure the fabric 210.

To manage these routing devices 302, 304, and 306, an analogous method to the method described with regard to FIG. 2A can be used by host device 205. Since host device 205 will now have the capability of managing routing devices 302, 304, and 306, for the remainder of this discussion, host device 205 will be called a "management station."

A system 200 in accordance with an embodiment of the present invention manages the routing devices 302, 304, and 306 within the fabric 210, by using the Fibre Channel Protocol for SCSI ("FCP"), which already is used in communicating with storage devices 222, 224, 226 and 230. In one embodiment, FCP can be based on SCSI-3. The management station 205 within this system utilizes FCP to facilitate its communication with routing devices 302, 304, and 306. In one embodiment, the management station 205 is connected via a Fibre Channel link to at least one of the routing devices 302 within the fabric 210 and communicates with and manages any of the routing devices 302, 304, and 306. In such an embodiment, the management station 205 recognizes the fabric 210 as an FCP target with a well-known address (e.g., FFFFFAh). The fabric 210, therefore, will now be treated like a SCSI logical controller with multiple logical units. In one embodiment of the present invention, the routing devices 302, 304, and 306 are managed based upon industry-standard SCSI Enclosure Services ("SES") commands. One skilled in the art will understand that SES is a subset of the FCP command set for storage device management purpose. "SCSI Enclosure Services (SES) Command Set, Rev 8a, Jan. 16, 1997" published by American National Standard for Information Technology is incorporated herein by reference in its entirety.

Figure 4:
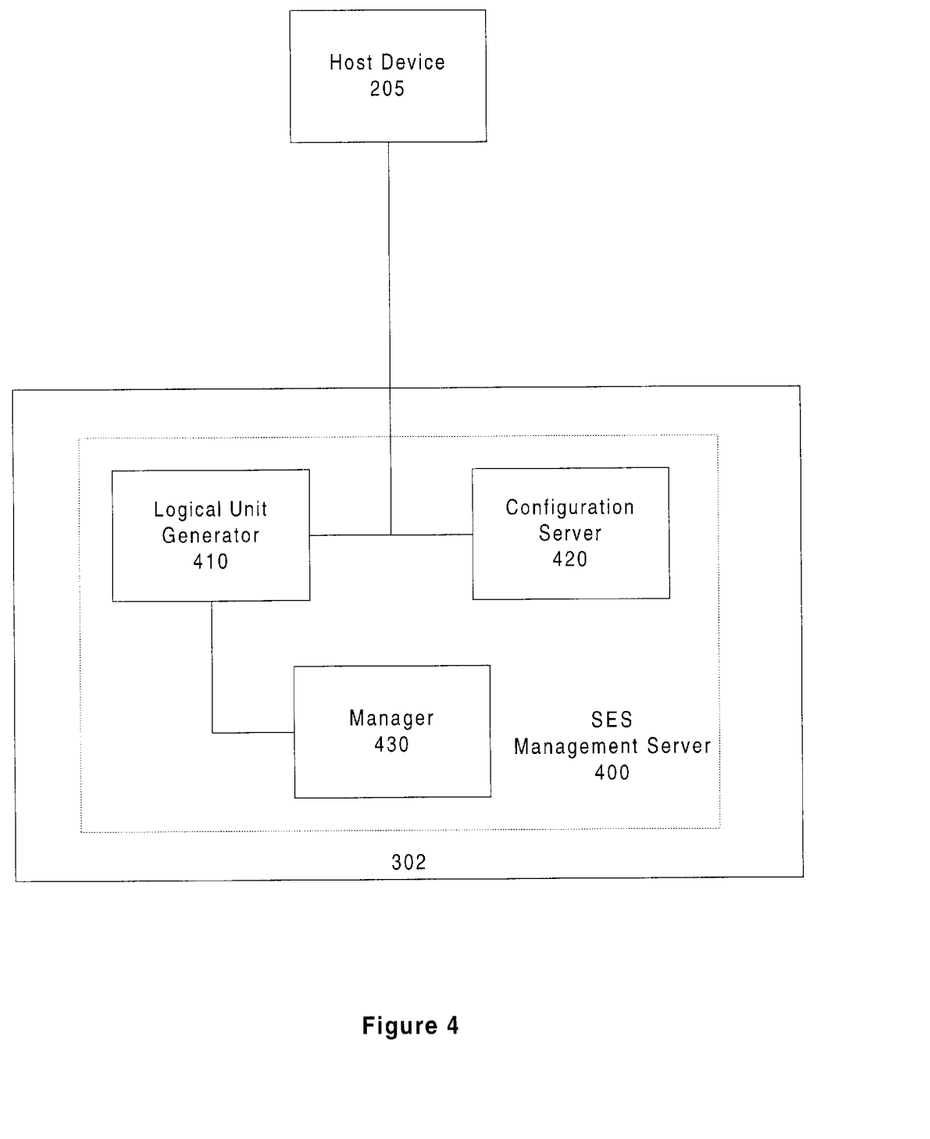
FIG. 4 illustrates a more detailed block diagram of a routing device within the fabric of an embodiment of the present invention.

FIG. 4 illustrates a more detailed block diagram of routing device 302 of an embodiment of the present invention. The routing device 302 includes an SES management server 400, which is used for managing routing device 302. The SES management server 400 includes a logical unit generator 410, a configuration server 420, and a manager 430. In one embodiment, the manager 410 supports SES commands. The configuration server 420 obtains information regarding the topology and composition of the fabric 210, and the logical unit generator 410 utilizes this information to assign a unique logical unit number ("LUN") to each routing device 302, 304, and 306 within the fabric 210. Subsequent to this assignment of LUNs to each routing device 302, 304, 306, the manager 430 communicates with the management station 205. The management station 205 now can communicate with the fabric 210 as though the fabric 210 were a logical fabric SES device 610, which includes multiple logical fabric SES units 602, 604, 606. Within this scheme, the management station 205 can access and communicate with all of these routing devices 302, 304, and 306 in a manner analogous to management station 205 accessing and communicating with logical units 232 and 234 as described with regard to FIG. 2B. One skilled in the art will recognize that in one embodiment, the logical unit generator 410, the configuration server 420, and the manager 430, are software modules. In an alternative embodiment, these modules can be implemented in hardware. In still another alternative embodiment, these modules can be implemented as a combination of hardware and software.

Figure 5A:
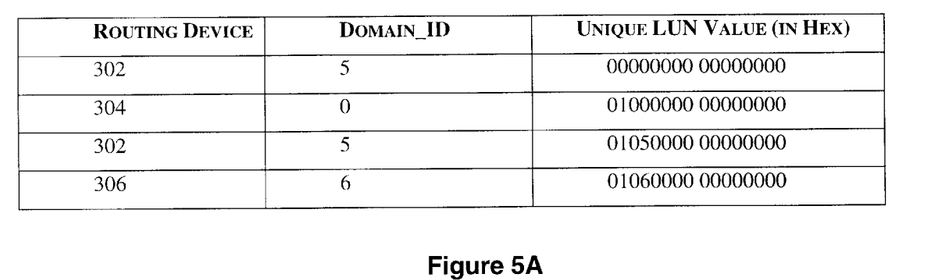
FIG. 5A illustrates a domain identifier to logical unit number mapping table of an embodiment of the present invention.

FIG. 5A illustrates a domain identifier to LUN mapping table that can be included in the logical unit generator 410 in one embodiment of the present invention. The domain identifier ("Domain_ID") for each routing device within the fabric is obtained by configuration server 420. The logical unit generator 410 retrieves this topological information from the configuration server 420 and maps these Domain_IDs to LUNs within the LUN mapping table. In particular, the logical unit generator 410 maps the Domain_ID to a unique LUN value, which is illustrated as a hexadecimal value. In one embodiment, for all logical units except LUN 0 (e.g., 00000000 00000000), byte one of the LUN value in hexadecimal is set using the Domain_ID of the routing device, and bytes 2 through 7 are set to zero.

Figure 5B:
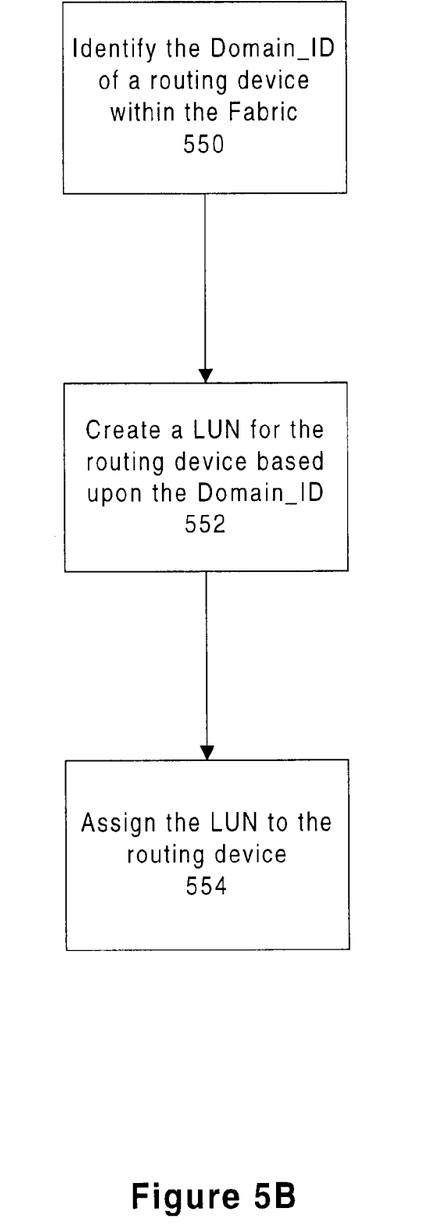
FIG. 5B illustrates a flowchart of the steps performed in assigning a logical unit number to a routing device of an embodiment of the present invention.

FIG. 5B illustrates a flowchart of the steps performed by the SES management server 400 in assigning a LUN value to each routing device 302, 304, or 306, of an embodiment of the present invention. The Domain_ID of a routing device is identified 550. A LUN value is created 552 based upon the Domain_ID. This LUN value then is assigned 554 to the corresponding routing device.

Figure 6A:
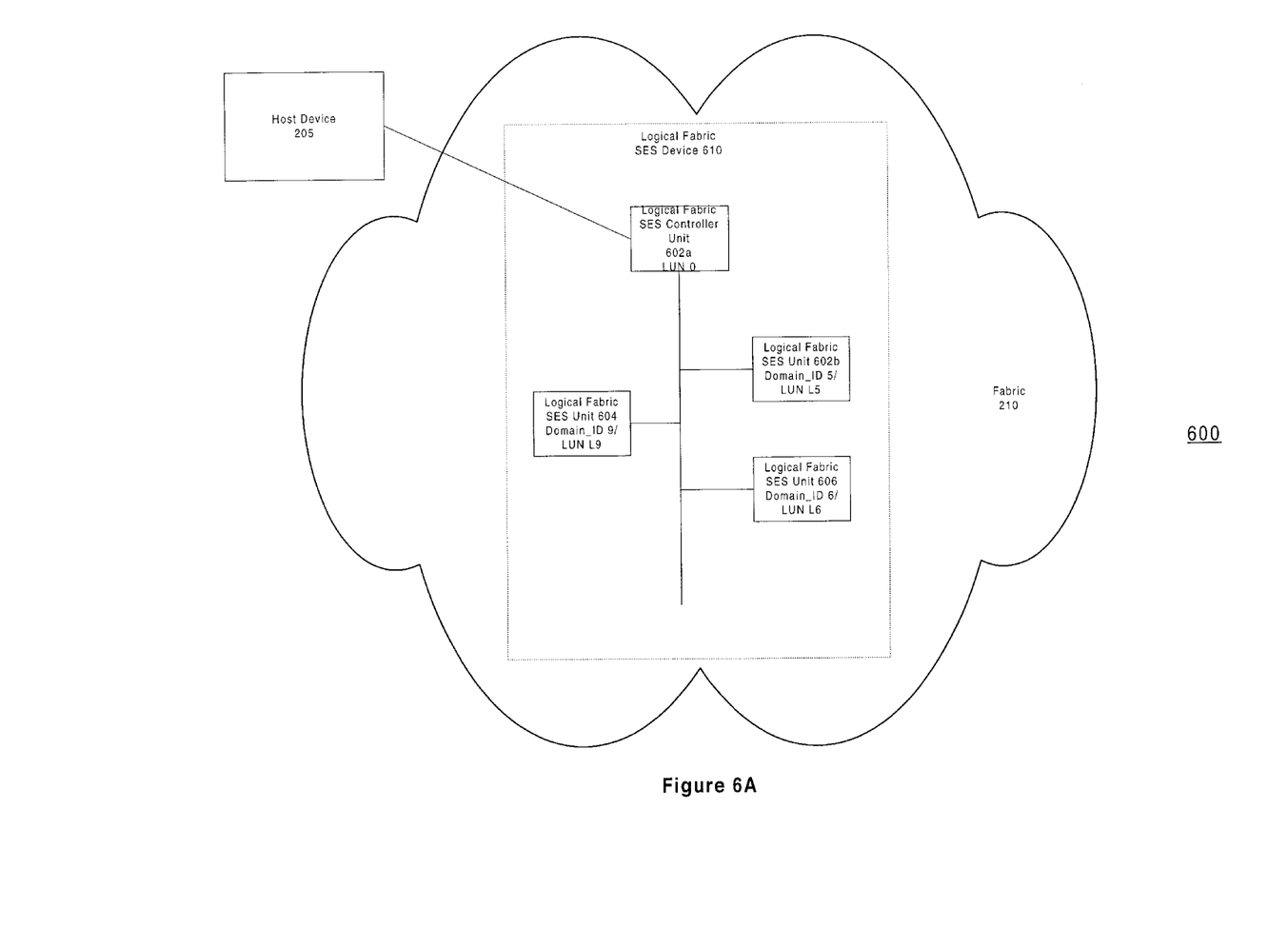
FIG. 6A illustrates a logical (fabric) SCSI Enclosure Services device of an embodiment of the present invention.

Regardless of the specific manner in which the LUNs are assigned to the routing devices 302, 304, and 306, the routing device 302 to which the management station 205 is physically connected, functions as the logical fabric SES controller unit 602a. In one embodiment, the logical fabric SES controller unit 602a is identified as LUN 0. By identifying the routing device 302 in the fabric 210 to which the management station 205 is physically connected as a logical fabric SES controller unit 602a, the logical fabric SES controller unit 602a is ensured to be present in the fabric 210. Thus, the management station 205 will communicate directly with logical fabric SES controller unit 602a in order to obtain information regarding the routing devices 302, 304 and 306 coupled to the fabric 210.

The routing device 302 to which the management station 205 is physically connected, is also assigned a LUN based upon the same algorithm used for assigning LUNs to routing devices 304, and 306. Hence, there are two logical fabric SES units corresponding to the routing device 302, which is physically connected to management station 205: a logical fabric SES controller unit 602a which is identified as LUN 0, and a logical fabric SES unit 602b, which is assigned a LUN in a similar manner as the other routing devices 304, and 306.

FIG. 6A illustrates a logical fabric SES device 610 of an embodiment of the present invention. As described above, each routing device 302, 304, and 306 within the fabric 210 is assigned a LUN. By assigning a LUN to each routing device 302, 304, and 306, routing devices 302, 304 and 306 are recharacterized as a logical controller 602a and logical fabric SES units 602b, 604, and 606. Hence, the fabric 210 now functions like a logical fabric SES device 610. Thus, management station 205 interacts with the logical fabric SES units 602b, 604, and 606, which correspond to routing devices 302, 304, and 306, respectively, in a similar manner as host device 205 interacted with device 230, logical units 232 and 234, and the logical controller unit 231, as discussed with regard to FIG. 2A. Through this reconfiguration of the fabric 210, the management station 205 now can manage the routing devices 302, 304, and 306 within the fabric 210. In addition, if more routing devices were added to the fabric 210, the SES management server 400 would automatically compensate accordingly by proceeding through the same steps 550, 552 and 554 to assign a LUN to the newly added routing device.

Figure 6B:
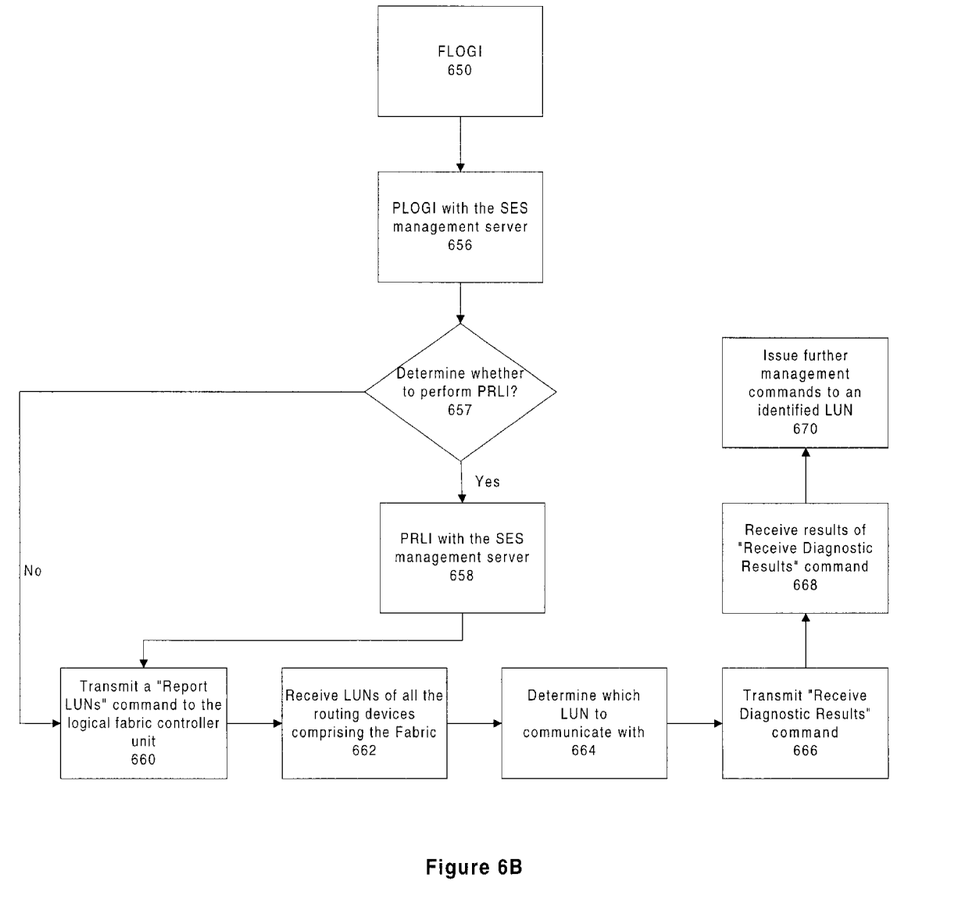
FIG. 6B illustrates a flowchart depicting the steps performed by a management station in communicating with a routing device within the fabric, of an embodiment of the present invention.

FIG. 6B illustrates a flowchart depicting the steps for managing the routing devices 302, 304, and 306 within fabric 210. The management station 205 performs a Fabric Login ("FLOGI") 650 in order to obtain a well-known address from the fabric 210. The management station 205 performs a Port Login ("PLOGI") 656 with the SES management server 400. The PLOGI step includes transmitting the well-known address (e.g., FFFFFAh) corresponding to the SES management server 400. The PLOGI 656 with the SES management server 400 establishes a link between the management station 205 and the logical fabric SES device 610.

The management station 205 then determines 657 whether the Process Login ("PRLI") step is to be performed with the SES management server 400. If PRLI needs to be performed, PRLI 658 is initiated to determine the capabilities of the logical fabric SES controller unit 602a. In one embodiment of the present invention, the PRLI step is optional. If PRLI does not need to be performed, step 660 is performed directly after step 657. In step 660, the management station 205 would transmit a "Report LUNs" command to the logical fabric SES controller unit 602a. If the management station 205 does not perform PRLI, the management station 205 will transmit 660 a "Report LUNs" command to the logical fabric SES controller unit 602a. The "Report LUNs" command results in the logical fabric SES controller unit 602a returning 662 a list of all the LUNs comprising the logical fabric SES device 610 to the management station 205.

The management station 205 determines 664 which routing device (e.g. 304) to obtain information from and manage. The management station 205 transmits 666 a "Receive Diagnostic Results" command to the LUN corresponding to a routing device (e.g. 404) for which the management station 205 has determined information is desired. Upon receiving this command, the specified logical fabric SES unit 610 returns 668 diagnostic or management data to the management station 205. Based on this diagnostic data, the management station 205 can proceed to manage the routing device 304 by issuing 670 further management commands to the corresponding logical fabric SES unit 604. For example, the management station 205 can perform a configuration, performance, and/or enclosure function on a routing device. The management station 205 can enable or disable a port on a specific routing device, take the temperature sensor readings of a routing device, or monitor the performance or error counters of a port on a specific routing device.

More specifically, the management station 205 can issue standard SCSI commands to routing devices 302, 304, and 306. For instance, the management station 205 can transmit a command to receive the "Switch Page," which will permit the management station 205 to obtain status information about a routing device (e.g. 304), its operational state and firmware as well as information about the boot date and time and the last date and time the firmware was updated. Similarly, the "Fabric Page" command allows the management station 205 to obtain information about the fabric 210, including what neighbors the fabric 210 has. Another example is the "Sensor Table Page" command, which provides the status of all sensors in a routing device 304. One skilled in the art will recognize that any other SCSI commands can be used by the management station 205 to obtain information regarding the fabric 210.

From the above description, it will be apparent to one skilled in the art that the present invention disclosed herein provides a novel and advantageous method and system for managing routing devices coupled within a fabric. The foregoing discussion discloses and describes merely exemplary embodiments of the present invention. As will be understood by those familiar with the art, the present invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A network routing device for use in a fabric, the routing device comprising:
   a logical fabric SCSI Enclosure Services controller unit;
   a logical fabric SCSI Enclosure Services unit coupled to said logical fabric SCSI Enclosure Services controller unit; and
   a SCSI Enclosure Services management server,
   wherein said SCSI Enclosure Services management server includes;
   a configuration server; and
   a logical unit generator coupled to said configuration server.

2. The routing device of claim 1, wherein said logical fabric SCSI Enclosure Services unit includes a logical unit number, said logical unit number being generated by said logical unit generator.

3. The routing device of claim 2, wherein said logical unit number corresponds to a domain identifier of the routing device.

4. A network fabric for connecting to a host device and a storage device, the fabric comprising:
   a first routing device for connecting to the host device, said first routing device including:
      a logical fabric SCSI Enclosure Services controller unit; and
      a logical fabric SCSI Enclosure Services unit coupled to said logical fabric SCSI Enclosure Services controller unit; and
   a second routing device coupled to said first routing device, said second routing device including a logical fabric SCSI Enclosure Services unit coupled to said logical fabric SCSI Enclosure Services controller unit.

5. The fabric of claim 4, wherein said first and second routing devices are switches.

6. The fabric of claim 4, wherein said logical fabric SCSI enclosure Services controller unit includes a logical unit number and said first routing device and second routing device logical fabric SCSI enclosure Services units each include a logical unit number different from each other and from said logical fabric SCSI Enclosure Services controller unit logical unit number.

7. The fabric of claim 6, wherein each said logical fabric SCSI Enclosure Services unit logical unit number corresponds to a domain identifier of each respective routing device.

8. The fabric of claim 4, said first routing device further including a SCSI Enclosure Services management server.

9. The fabric of claim 8, wherein said SCSI Enclosure Services management server includes:
   a configuration server; and
   a logical unit generator coupled to said configuration server.

10. The fabric of claim 9, wherein said first routing device and said second routing device logical fabric SCSI enclosure Services units each include a different logical unit number, said logical unit numbers being generated by said logical unit generator.

11. The fabric of claim 10, wherein said logical unit numbers correspond to a domain identifier of each respective routing device.

12. A network comprising:
   a host;
   a storage unit; and
   a network fabric connecting said host and said storage device, said fabric including:
      a first routing device for connecting to the host device, said first routing device including:
         a logical fabric SCSI Enclosure Services controller unit; and
         a logical fabric SCSI Enclosure Services unit coupled to said logical fabric SCSI Enclosure Services controller unit; and
      a second routing device coupled to said first routing device, said second routing device including a logical fabric SCSI Enclosure Services unit coupled to said logical fabric SCSI Enclosure Services controller unit.

13. The network of claim 12, wherein said first and second routing devices are switches.

14. The network of claim 12, wherein said logical fabric SCSI enclosure Services controller unit includes a logical unit number and said first routing device and second routing device logical fabric SCSI enclosure Services units each include a logical unit number different from each other and from said logical fabric SCSI Enclosure Services controller unit logical unit number.

15. The network of claim 14, wherein each said logical fabric SCSI Enclosure Services unit logical unit number corresponds to a domain identifier of each respective routing device.

16. The network of claim 12, said first routing device further including a SCSI Enclosure Services management server.

17. The network of claim 16, wherein said SCSI Enclosure Services management server includes:
   a configuration server; and
   a logical unit generator coupled to said configuration server.

18. The network of claim 17, wherein said first routing device and said second routing device logical fabric SCSI Enclosure Services units each include a different logical unit number, said logical unit numbers being generated by said logical unit generator.

19. The network of claim 18, wherein said logical unit numbers correspond to a domain identifier of each respective routing device.

20. A method for managing at least two routing devices forming a network fabric as a logical unit, the fabric connecting a host and a storage unit, the method comprising:
   in a first routing device which is connected to the host, providing a logical fabric SCSI Enclosure Services controller unit and a logical fabric SCSI Enclosure Services unit coupled to said logical fabric SCSI Enclosure Services controller unit; and
   in a second routing device coupled to said first rouging device, providing a logical fabric SCSI Enclosure Services unit coupled to said logical fabric SCSI enclosure Services controller unit.

21. The method of claim 20, wherein said first and second routing devices are switches.

22. The method of claim 20, further comprising:
   in the first routing device further providing a SCSI Enclosure Services management server.

23. The method of claim 22, wherein said SCSI Enclosure Services management server includes:
   a configuration server; and
   a logical unit generator coupled to said configuration server.

24. The method of claim 23, wherein said first routing device and said second routing device logical fabric SCSI Enclosure Services units each include a different logical unit number, said logical unit numbers being generated by said logical unit generator.

25. The method of claim 24, wherein said logical unit numbers correspond to a domain identifier of each respective routing device.

26. A network routing device for use in a fabric with another network routing device, the routing device comprising:
- a logical fabric SCSI Enclosure Services controller unit;
- a logical fabric SCSI Enclosure Services unit coupled to said logical fabric SCSI Enclosure Services controller unit; and
- a communication path for coupling said logical fabric SCSI Enclosure Services controller unit to an external network routing device which includes a logical fabric SCSI Enclosure Services unit.

27. The routing device of claim 26, wherein the routing device is a switch.

28. The routing device of claim 26, wherein said logical fabric SCSI Enclosure Services controller unit includes a logical unit number and said logical fabric SCSI Enclosure Services unit includes a logical unit number different from that of said logical fabric SCSI Enclosure Services controller unit.

29. The routing device of claim 28, wherein said logical fabric SCSI Enclosure Services unit logical unit number corresponds to a domain identifier of the routing device.

30. The routing device of claim 26, further comprising:

a SCSI Enclosure Services management server.

31. The routing device of claim 30, wherein said SCSI Enclosure Services management server includes:

a configuration server; and a logical unit generator coupled to said configuration server.

32. The routing device of claim 31, wherein said logical fabric SCSI Enclosure Services unit includes a logical unit number, said logical unit number being generated by said logical unit generator.

33. The routing device of claim 32, wherein said logical unit number corresponds to a domain identifier of the routing device.

* * * * *